(12) United States Patent
Xue et al.

(10) Patent No.: US 11,608,018 B2
(45) Date of Patent: Mar. 21, 2023

(54) ACTIVE EXTENSION TYPE CAR FRONT BUMPER

(71) Applicant: Jiangsu University, Jiangsu (CN)

(72) Inventors: Hongtao Xue, Jiangsu (CN); Dianyong Ding, Jiangsu (CN); Meng Wu, Jiangsu (CN); Ziming Zhang, Jiangsu (CN)

(73) Assignee: Jiangsu University, Jiangsu (CN)

( * ) Notice: Subject to any disclaimer, the term of this patent is extended or adjusted under 35 U.S.C. 154(b) by 0 days.

(21) Appl. No.: 17/439,411

(22) PCT Filed: Mar. 25, 2021

(86) PCT No.: PCT/CN2021/082905
§ 371 (c)(1),
(2) Date: Sep. 15, 2021

(87) PCT Pub. No.: WO2022/088600
PCT Pub. Date: May 5, 2022

(65) Prior Publication Data
US 2022/0281397 A1    Sep. 8, 2022

(30) Foreign Application Priority Data
Oct. 26, 2020 (CN) .......................... 202011152297.5

(51) Int. Cl.
B60R 19/40 (2006.01)
B60R 19/36 (2006.01)
B60R 19/02 (2006.01)

(52) U.S. Cl.
CPC ............. B60R 19/40 (2013.01); B60R 19/36 (2013.01); B60R 2019/026 (2013.01)

(58) Field of Classification Search
CPC ......... B60R 19/40; B60R 19/36; B60R 19/38; B60R 19/26
See application file for complete search history.

(56) References Cited

U.S. PATENT DOCUMENTS 5,593,195 A * 1/1997 Lei .......................... B60R 19/36
293/30
5,967,573 A 10/1999 Wang
(Continued)

FOREIGN PATENT DOCUMENTS

CN 201056189 5/2008
CN 103600711 2/2014
(Continued)

OTHER PUBLICATIONS

"International Search Report (Form PCT/ISA/210) of PCT/CN2021/082905," dated Jul. 12, 2020, pp. 1-5.
(Continued)

*Primary Examiner* — Joseph D. Pape
(74) *Attorney, Agent, or Firm* — JCIP Global Inc.

(57) ABSTRACT

The present invention discloses an active extension type car front bumper. Three fixed sleeves are rigidly connected to a cross beam of a U-shaped fixed frame, an impact rod is fitted in each fixed sleeve, a front end of each impact rod passes through the cross beam and is fixedly connected to the bumper, and a rear end of each impact rod is fixedly connected to a movable cross beam arranged horizontally left and right. Left and right longitudinal beams of the U-shaped fixed frame are each provided with a movable longitudinal beam that is movable forward and backward. Left and right ends of the movable cross beam respectively extend into the left and right longitudinal beams. A rear end of each movable longitudinal beam is fixedly connected to a hydraulic mechanism. An energy absorption mechanism is provided between every two adjacent fixed sleeves.

6 Claims, 8 Drawing Sheets

(56) References Cited

U.S. PATENT DOCUMENTS

| | | | | |
|---|---|---|---|---|
| 5,971,451 A | * | 10/1999 | Huang | B60R 19/18 |
| | | | | 293/121 |
| 6,217,090 B1 | * | 4/2001 | Berzinji | B60R 19/48 |
| | | | | 293/106 |

FOREIGN PATENT DOCUMENTS

| | | | | |
|---|---|---|---|---|
| CN | 106347265 | | 1/2017 | |
| CN | 106394457 | | 2/2017 | |
| CN | 108583488 | | 9/2018 | |
| CN | 110053575 A | * | 7/2019 | ............. B60R 19/22 |
| CN | 111391772 | | 7/2020 | |
| CN | 112193193 | | 1/2021 | |
| DE | 102013001585 | | 8/2014 | |

OTHER PUBLICATIONS

"Written Opinion of the International Searching Authority (Form PCT/ISA/237) of PCT/CN2021/082905," dated Jul. 26, 2021, pp. 1-5.

\* cited by examiner

ACTIVE EXTENSION TYPE CAR FRONT BUMPER

CROSS-REFERENCE TO RELATED APPLICATION

This application is a 371 of international application of PCT application serial no. PCT/CN2021/082905, filed on Mar. 25, 2021 which claims the priority benefit of China application no. 202011152297.5, filed on Oct. 26, 2020. The entirety of each of the above mentioned patent applications is hereby incorporated by reference herein and made a part of this specification.

BACKGROUND

Technical Field

The present invention relates to the technical field of car bumpers, and specifically, to an active extension type car front bumper.

Description of Related Art

A bumper is a necessary safety device of a car, and functions to absorb and buffer external impact to protect a car body from direct impact. A current car bumper is composed of three parts, namely, an outer plate, a cushioning material, and a cross beam, where the outer plate and the cushioning material are made of plastic, the cross beam is stamped from a cold-rolled sheet into a U-groove, and the outer plate and the cushioning material are attached to the cross beam. Although the bumper has an increasingly strong energy absorption effect, the bumper is rigidly connected to a frame, so that energy is buffered and absorbed only passively during a collision and the buffer distance is short, and in the event of a large collision, the ability to use deformation of the bumper to absorb energy so as to resist impact is weak, the cushioning effect is undesirable, and still a lot of impact energy is transferred to the car body, which causes great harm to people in the car. Currently, extending the distance between a bumper and a frame to improve the cushioning ability of the bumper can be regarded as an effective method to improve the safety performance of the bumper. For example, Chinese Patent application No. 201611046647.3 entitled "OUTWARDS-EXTENDING ENERGY STORAGE TYPE CAR FRONT BUMPER" has disclosed a solution in which a buffer distance of the bumper can be increased, but the buffer clearance needs to be adjusted by operating a rotation handle in advance; thus, the bumper cannot be extended to the maximum extent due to the restriction of the vehicle distance, and switching between a normal state and an operating state of the car bumper cannot be realized. Moreover, the absence of additional energy absorbing devices causes undesirable energy absorption effect of the bumper.

SUMMARY

The objective of the present invention is to provide an active extension type car front bumper in order to overcome the deficiencies in the prior art. The bumper extends forward through an active extension mechanism in an operating state and a buffer distance of the bumper is increased, and energy generated during a collision can be absorbed in a multi-stage energy absorption mode, so that damage to a car body can be reduced, harm to drivers and passengers can be alleviated, and driving safety of a car can be improved.

In order to achieve the aforementioned objective, the present invention adopts the following technical solution. A fixed and left-right symmetrical U-shaped fixed frame is disposed right behind a bumper, a U-shaped opening of the U-shaped fixed frame faces right behind, and the U-shaped fixed frame includes a cross beam on a front side and one left longitudinal beam and one right longitudinal beam. Three fixed sleeves distributed respectively on the left, in the middle, and on the right are rigidly connected to a rear side wall of the cross beam of the U-shaped fixed frame, an impact rod is fitted with clearance in the middle of an interior of each fixed sleeve, a front end of each impact rod passes through the cross beam of the U-shaped fixed frame and then is fixedly connected to the bumper, and a rear end of each impact rod extends out of the fixed sleeve and then is fixedly connected to a movable cross beam that is arranged horizontally left and right. The left longitudinal beam and the right longitudinal beam of the U-shaped fixed frame are each provided with a movable longitudinal beam that is capable of moving forward and backward, a left end and a right end of the movable cross beam respectively extend into the corresponding left longitudinal beam and the corresponding right longitudinal beam of the U-shaped fixed frame and are fixedly connected to front ends of the corresponding movable longitudinal beams, and a rear end of each movable longitudinal beam is fixedly connected to a hydraulic mechanism. An energy absorption mechanism is provided between every two adjacent fixed sleeves, each energy absorption mechanism includes a fixed rack that is horizontal in forward and backward directions, a front end of the fixed rack is rigidly connected to the cross beam of the U-shaped fixed frame, a left side wall and a right side wall of the fixed rack are both provided with helical teeth and the helical teeth are inclined forward, two movable racks are respectively distributed on a left side and a right side of the fixed rack, and helical teeth of the two movable racks are inclined backward and engaged with the helical teeth of the fixed rack. A left side and a right side of the fixed rack are each further provided with a T-shaped spring seat, a rear end of the T-shaped spring seat is rigidly connected to the movable cross beam, and a return spring that is horizontal left and right is connected between the T-shaped spring seat and the movable rack on a same side. Each impact rod has a stepped rod shape and has a front segment with a larger diameter and a rear segment with a smaller diameter, a high-strength spring is disposed inside each fixed sleeve, and the high-strength spring is fitted with clearance on the rear segment of the impact rod. A positioning mechanism capable of locking the movable longitudinal beam is connected to each longitudinal beam of the U-shaped fixed frame, two hydraulic mechanisms simultaneously drive the movable longitudinal beams and the movable cross beam to push out forward, the movable cross beam pushes the T-shaped spring seats and the impact rods forward, and the bumper reaches an extension destination.

The beneficial effects with the aforementioned technical solution are as follows. As compared with a conventional car bumper, in the present invention, energy absorption mechanisms and an active extension mechanism are added, and the active extension mechanism and the energy absorption mechanisms are provided to change the distance between a bumper and a car body and increase a buffer distance of the bumper. The bumper is driven by hydraulic mechanisms in an operating state and extends forward through the active extension mechanism, and the buffer distance of the bumper is increased. A piston ejector rod actively extends forward to push the active extension mechanism to extend in a fixed direction, and a positioning pin is used to locate an extension destination. In the event of a collision, energy generated during the collision can be absorbed through high-strength springs, the energy absorption mechanisms, and the hydraulic mechanisms in a multi-stage energy absorption mode. First, the bumper receives an impact force and transfers the impact force to impact rods and the high-strength spring, and the springs buffer part of impact energy. Next, the impact rods push a movable cross beam, and drive racks in the energy absorption mechanisms to shear each other and then absorb part of the energy generated during the impact. Then, the hydraulic mechanisms absorb part of the impact energy. In this way, multi-stage buffering of the collision energy is realized through the high-strength springs, the energy absorption mechanisms, and the hydraulic mechanisms, the purposes of making the distance between the bumper and a fixed frame variable, increasing the buffer distance and realizing multi-stage absorption of collision energy are achieved, the design practicality of the bumper is improved, damage to the car body can be effectively reduced, harm to drivers and passengers in the car can be alleviated, and driving safety of the car can be improved.

DESCRIPTION OF THE EMBODIMENTS

Figure 1:
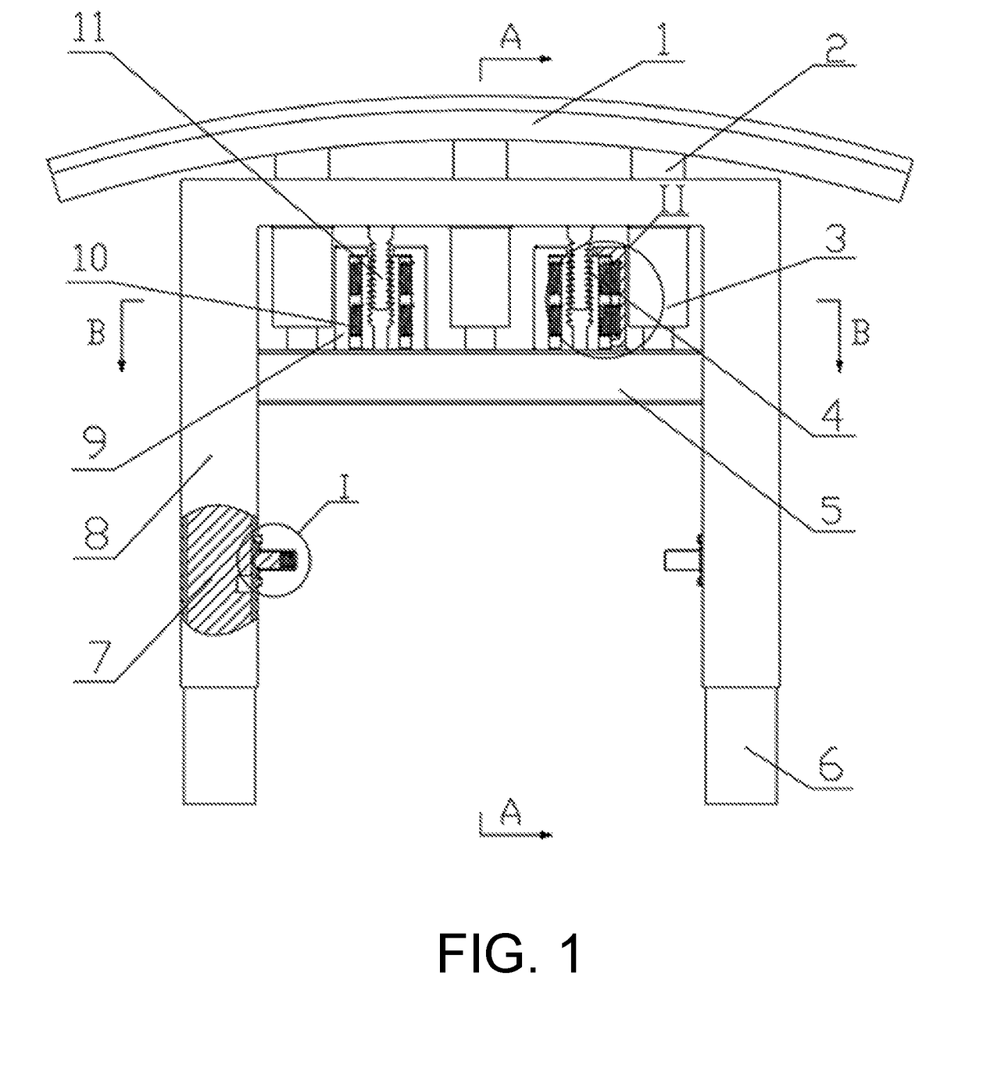
FIG. 1 is a schematic structural view illustrating an initial state of an active extension type car front bumper in the present invention.

In order to facilitate understanding of arrangement directions, it is defined that a driving direction of a vehicle is "forward" and an opposite direction thereof is "backward". A bumper 1 in FIG. 1 is in the front, and a movable cross beam 5 is in the back. The bumper 1 is symmetrical left and right. During movement in left and right directions with respect to a central axis of the bumper 1, the side near the central axis of the bumper 1 is "inner," and the opposite side is "outer."

As shown in FIG. 1, a U-shaped fixed frame 8 is disposed right behind the bumper 1. The U-shaped fixed frame 8 is fixed and arranged symmetrically left and right. A U-shaped opening of the U-shaped fixed frame 8 faces right behind, and the U-shaped fixed frame 8 includes a cross beam on a front side and one left longitudinal beam and one right longitudinal beam. The cross beam and the longitudinal beams are all rectangular plate-shaped. The cross beam is a solid beam arranged in left and right directions, and the two longitudinal beams are hollow beams arranged in forward and backward directions.

Three fixed sleeves 3 are rigidly connected to a rear side wall of the cross beam of the U-shaped fixed frame 8. The three fixed sleeves 3 are respectively distributed on the left, in the middle, and on the right, have the same structure and are all arranged horizontally in forward and backward directions. A central axis of the fixed sleeve 3 in the middle is colinear with central axes of the U-shaped fixed frame 8 and the bumper 1, and the fixed sleeve 3 on the left side and the fixed sleeve 3 on the right side are symmetrical left and right with respect to the fixed sleeve 3 in the middle.

An impact rod 2 is coaxially fitted with clearance in the middle of the interior of each fixed sleeve 3, and the three impact rods 2 have the same structure. A front end of each impact rod 2 passes through a corresponding through hole in the cross beam of the U-shaped fixed frame 8 and then is rigidly connected to the bumper 1. A rear end of each impact rod 2 extends out of the fixed sleeve 3 and is fixedly connected to a movable cross beam 5 that is arranged horizontally left and right, where the movable cross beam 5 is right behind the three fixed sleeves 3. The movable cross beam 5, the impact rods 2, and the bumper 1 can simultaneously move forward and backward.

A left end and a right end of the movable cross beam 5 respectively extend into the left longitudinal beam and the right longitudinal beam of the U-shaped fixed frame 8. The left longitudinal beam and the right longitudinal beam are provided with square grooves, and openings of the square grooves are provided in inner side walls of the longitudinal beams and face the left end and the right end of the movable cross beam 5. The left end and the right end of the movable cross beam 5 extend into the square grooves, and the movable cross beam 5 can move forward and backward in the left square groove and the right square groove.

An energy absorption mechanism is disposed both between the fixed sleeve 3 on the left side and the fixed sleeve 3 in the middle and between the fixed sleeve 3 on the right side and the fixed sleeve 3 in the middle. That is, an energy absorption mechanism is provided between every two adjacent fixed sleeves 3. The two energy absorption mechanisms have the same structure and are arranged symmetrically left and right with respect to the fixed sleeve 3 in the middle. Each energy absorption mechanism includes a movable rack 4, a T-shaped spring seat 9, a return spring 10, and a fixed rack 11. A frontmost end of each energy absorption mechanism is connected to the cross beam of the U-shaped fixed frame 8, and a rearmost end is connected to the movable cross beam 5.

The square grooves of the two longitudinal beams of the U-shaped fixed frame 8 each have a movable longitudinal beam 7 mounted therein, where the movable longitudinal beam 7 can move forward and backward in the longitudinal beam of the U-shaped fixed frame 8. Front ends of the left movable longitudinal beam 7 and the right movable longitudinal beam 7 are correspondingly fixedly connected to the left end and the right end of the movable cross beam 5 respectively. When the movable longitudinal beams 7 move forward and backward, the movable cross beam 5 can be driven to move forward and backward.

Rear ends of the two longitudinal beams of the U-shaped fixed frame 8 are each connected to a hydraulic cylinder assembly 6. The hydraulic cylinder assembly 6 extends into the square groove of the corresponding longitudinal beam, and a front end of the hydraulic cylinder assembly 6 is fixedly connected to a rear end of the movable longitudinal beam 7. In this way, when the hydraulic cylinder assemblies 6 operate, the movable longitudinal beams 7 are pushed to move forward and backward, so as to drive the movable cross beam 5, the three impact rods 2, and the bumper 1 to move forward and backward.

Figure 2:
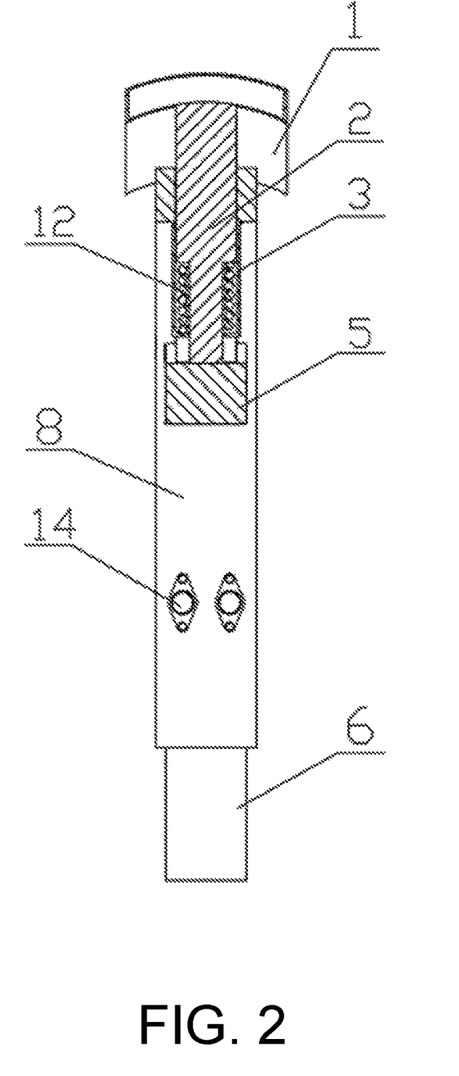
FIG. 2 is an enlarged sectional view along A-A in FIG. 1.

As shown in FIG. 2, each impact rod 2 is a variable-diameter cylindrical rod, has a stepped rod shape, and has a front segment with a larger diameter and a rear segment with a smaller diameter. A high-strength spring 12 is disposed inside each fixed sleeve 3, where the high-strength spring 12 is fitted with clearance on the rear segment of the impact rod 2, and an outer diameter of the high-strength spring 12 is less than the diameter of the front segment of the impact rod 2. In this way, a front end of the high-strength spring 12 can press against a stepped surface of the impact rod 2, and a rear end of the high-strength spring 12 is rigidly connected to an inner bottom surface in the rear of the fixed sleeve 3. A rear end of the impact rod 2 extends out of the fixed sleeve 3 and is fixedly connected to the movable cross beam 5. In an initial state, the high-strength spring 12 is in a compressed state.

Figure 3:
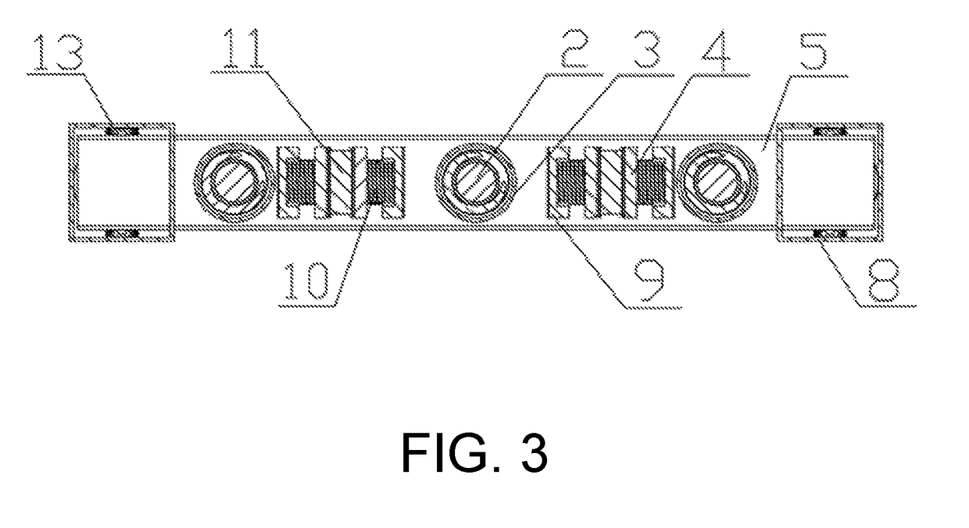
FIG. 3 is an enlarged sectional view along B-B in FIG. 1.

As shown in FIG. 3, a longer guide rail arranged in forward and backward directions is disposed inside each longitudinal beam of the U-shaped fixed frame 8, where the longer guide rail is disposed on an upper inner side wall and a lower inner side wall inside the longitudinal beam. Pulleys 13 are disposed on an upper side wall and a lower side wall of each movable longitudinal beam 7. The pulleys 13 match the longer guide rail on the longitudinal beam of the U-shaped fixed frame 8, making it easy for the movable longitudinal beam 7 to slide and extend forward.

Accordingly, the linked impact rods 2, movable cross beam 5, movable longitudinal beams 7, high-strength springs 12, pulleys 13, and the like constitute an active extension mechanism.

Figure 4:
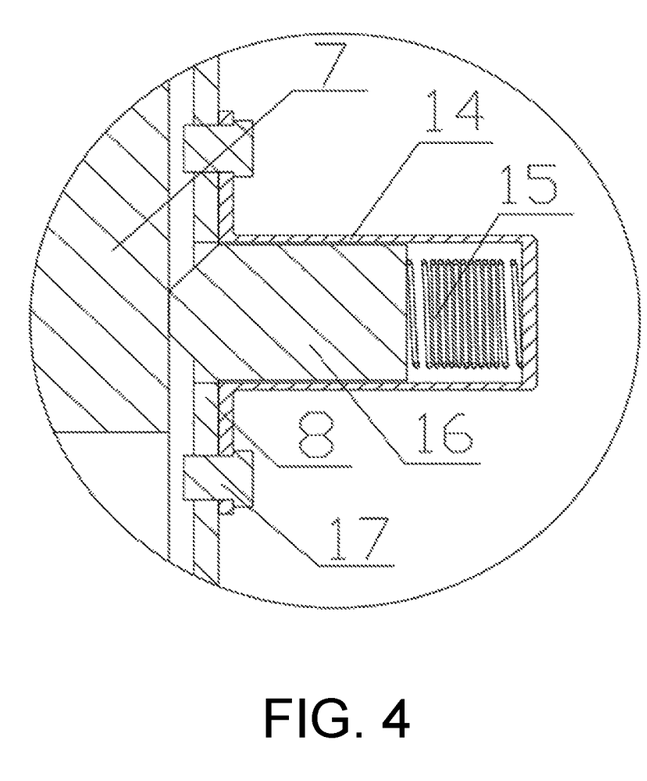
FIG. 4 is a partial enlarged view of I in FIG. 1.

As shown in FIG. 2 and FIG. 4, a positioning mechanism is connected to each longitudinal beam of the U-shaped fixed frame 8, and each positioning mechanism includes a pin bushing 14, a pin spring 15, and a pin 16. The pin bushing 14 is fixedly connected to the inner side wall of the longitudinal beam of the U-shaped fixed frame 8 by means of screws 17, the pin bushing 14 is arranged horizontally left and right, the pin spring 15 and the pin 16 arranged horizontally left and right are provided inside the pin bushing 14, an inner end of the pin spring 15 is rigidly connected to the pin bushing 14, and an outer end of the pin spring 15 is rigidly connected to an inner end of the pin 16. Under the action of the pin spring 15, an outer end of the pin 16 can position and lock the movable longitudinal beam 7 after extending into the longitudinal beam. The pin spring 15 is in a compressed state before extension.

Figure 5:
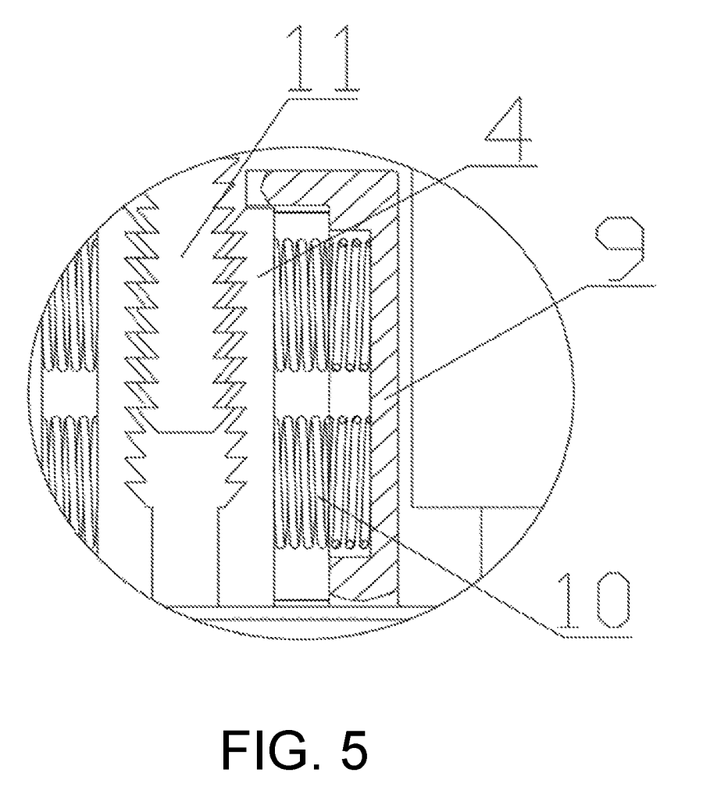
FIG. 5 is a partial enlarged view of II in FIG. 1.

As shown in FIG. 5, each energy absorption mechanism includes a fixed rack 11, the fixed rack 11 is arranged horizontally in forward and backward directions, a front end of the fixed rack 11 is rigidly connected to the cross beam of the U-shaped fixed frame 8, and a rear end of the fixed rack 11 has a distance from the movable cross beam 5, where the distance is greater than a length that the movable cross beam 5 extends forward, so that the movable cross beam 5 does not touch the fixed rack 11 when extending forward to an extreme position. A left side wall and a right side wall of the fixed rack 11 are provided with helical teeth, and the fixed rack 11 is a structure of double-side rack. A left side and a right side of the fixed rack 11 are each further provided with a T-shaped spring seat 9, a horizontal cross section of the T-shaped spring seat 9 is T-shaped, a rear end of the T-shaped spring seat 9 is rigidly connected to the movable cross beam 5, a front end of the T-shaped spring seat 9 has a distance from the cross beam of the U-shaped fixed frame 8, where the distance is greater than the length that the movable cross beam 5 extends forward, and the T-shaped spring seat 9 does not contact the cross beam of the U-shaped fixed frame 8. The two T-shaped spring seats 9 are arranged symmetrically left and right with respect to a center of the fixed rack 11. Helical teeth on each of two sides of the fixed rack 11 are engaged with a movable rack 4, and the two movable racks 4 are respectively distributed on the left side and the right side of the fixed rack 11 and are arranged symmetrically left and right with respect to the center of the fixed rack 11. The helical teeth of the fixed rack 11 are inclined forward, and helical teeth of the movable racks 4 are inclined backward and engaged with the helical teeth of the fixed rack 11. A return spring 10 is connected between the T-shaped spring seat 9 and the movable rack 4 on a same side, and the return spring 10 is arranged horizontally left and right. Two return springs 10 are connected between each movable rack 4 and the corresponding T-shaped spring seat 9, and the two return springs 10 are arranged one behind the other. One end of the return spring 10 is rigidly connected to the T-shaped spring seat 9, and the other end is rigidly connected to the movable rack 4, rigidly connected to a toothless side of the movable rack 4.

The T-shaped spring seat 9 is provided with corresponding circular recesses for mounting the return springs 10. A front end surface and a rear end surface of the movable rack 4 are both provided with recesses, the T-shaped spring seat 9 is provided with a shorter guide rail for matching the recess on the front end surface of the movable rack 4, and a front end surface of the movable cross beam 5 is also provided with a shorter guide rail of the same specification for matching the recess on the rear end surface of the movable rack 4. When the return springs 10 drive the movable rack 4 to move left and right, the front end and the rear end of the movable rack 4 move along the shorter guide rails. In operation, lubricating oil is added to the recesses on the front end surface and the rear end surface of the movable rack 4, functioning to facilitate guiding and movement of the movable rack 4 during extension.

Therefore, a single energy absorption mechanism is composed of two movable racks 4, two T-shaped spring seats 9, four return springs 10, and one fixed rack 11. The two energy absorption mechanisms are distributed in intervals each between every two adjacent fixed sleeves 3 symmetrically using the central axis of the bumper 1 as an axis.

Figure 6:
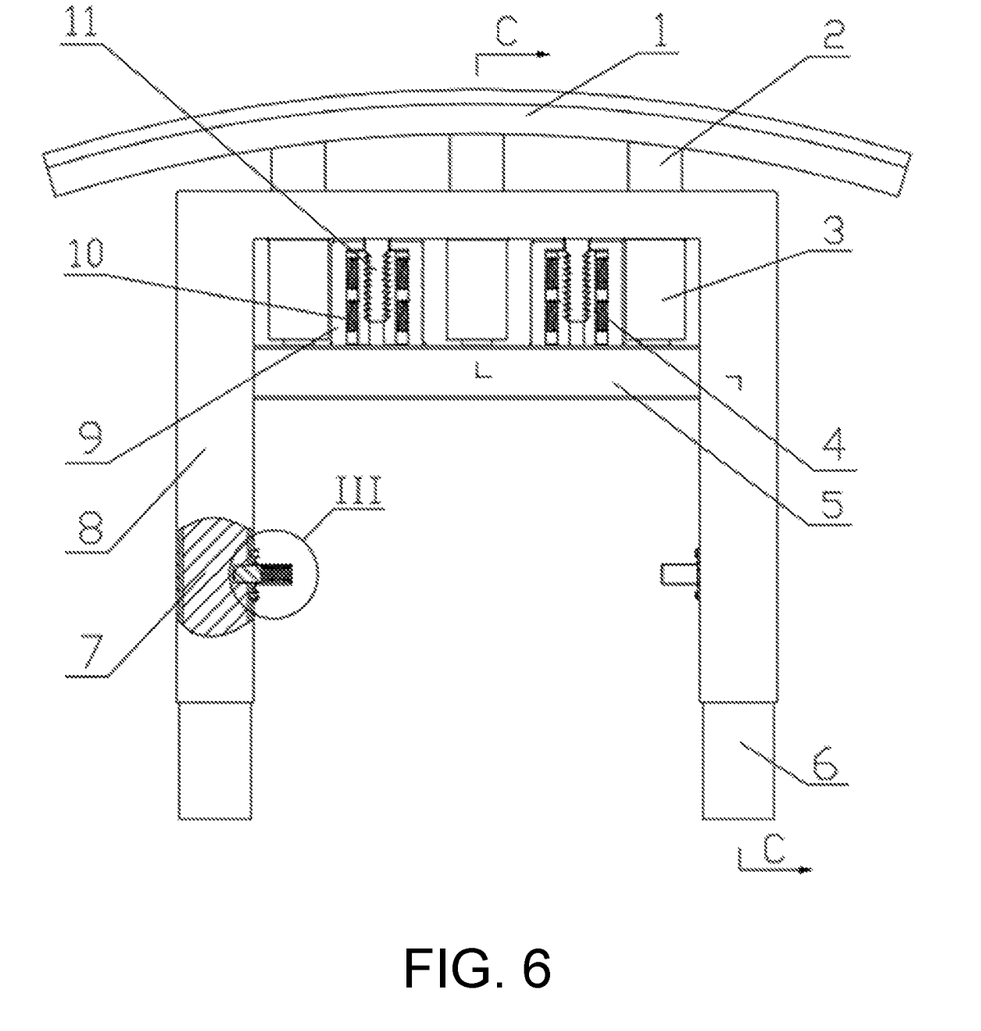
FIG. 6 is a schematic view illustrating a state of the present invention after extending forward from the initial state shown in FIG. 1.
Figure 7:
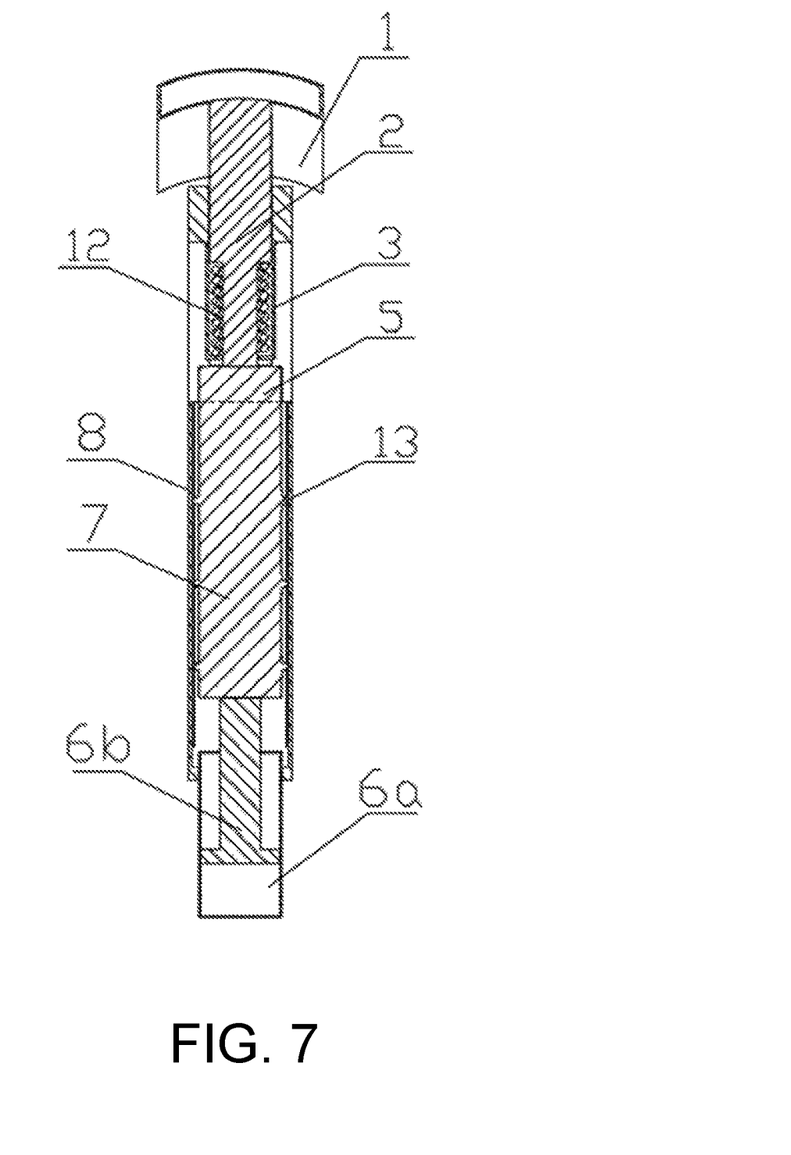
FIG. 7 is an enlarged sectional view along C-C in FIG. 6.

As shown in FIG. 6 and FIG. 7, the hydraulic cylinder assembly 6 forms a hydraulic mechanism, and the hydraulic cylinder assembly 6 includes a hydraulic cylinder 6a and a piston ejector rod 6b. A cylinder body of the hydraulic cylinder 6a is fixedly connected to a rear end of the longitudinal beam of the U-shaped fixed frame 8, and the piston ejector rod 6b extends forward from the hydraulic cylinder 6a into the longitudinal beam of the U-shaped fixed frame 8 and is fixedly connected to the rear end of the movable longitudinal beam 7. The piston ejector rod 6b can move in forward and backward directions so as to drive the movable longitudinal beam 7 to move forward and backward.

Figure 8:
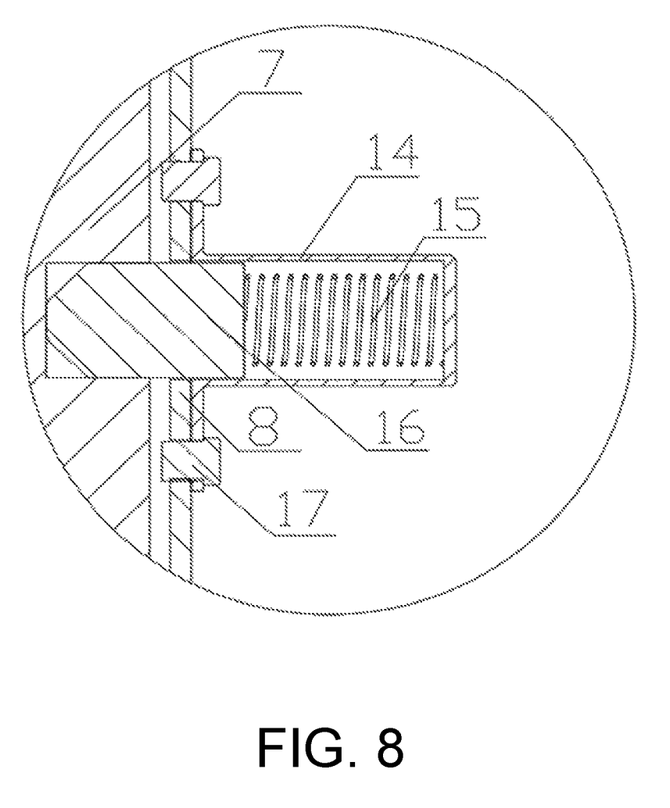
FIG. 8 is a partial enlarged view of III in FIG. 6.

During operation of the present invention, the initial state is shown in FIG. 1, where all parts including the U-shaped fixed frame 8 are considered to be in a stationary state relative to the car body. A vehicle-mounted radar ranging device dynamically measures a distance from an obstacle or vehicle ahead, a vehicle speed sensor measures a current driving speed of the vehicle, and then, measured vehicle distance and vehicle speed signals are fed back to an ECU control unit through a sensing device. When the vehicle distance and vehicle speed satisfy certain conditions, the ECU control unit issues an instruction in advance, a motor drives the hydraulic mechanisms to operate, an oil pump applies a certain oil pressure to the hydraulic cylinders 6a, so that the piston ejector rods 6b push out forward and push the movable longitudinal beams 7, the movable longitudinal beams 7 are pushed out forward along the longer guide rail by the pulleys 13, driving the movable cross beam 5 to push out forward together, the movable cross beam 5 pushes the rigidly connected T-shaped spring seats 9, and then pushes the movable racks 4 forward, and the movable cross beam 5 also pushes the impact rods 2 rigidly connected to the front surface thereof. During extension of the impact rods 2, the high-strength springs 12 recover from the compressed state to the original state, as shown in FIG. 7, and finally, the impact rods 2 push the bumper 1 to extend forward, as shown in FIG. 6, to realize active extension of the movable cross beam 5 and the movable longitudinal beams 7. When the bumper 1 reaches the extension destination, the pin 16 is ejected under an elastic force of the pin spring 15 mounted in the pin bushing 14, enters the circular recess on the inner side of the movable longitudinal beam 7 and matching the pin 16, and fixes the movable longitudinal beam 7, thereby achieving a positioning effect. At the end of the extension, the pin spring 16 recovers from the compressed state to the original state, as shown in FIG. 8.

When the vehicle has a collision accident, the bumper 1 receives a force and transfers the force to the three impact rods 2, and the impact rods 2 move backward and compress the high-strength springs 12 to realize first-stage energy absorption, thereby buffering part of energy generated during the collision. Meanwhile, the impact rods 2 push the movable cross beam 5 backward, the movable cross beam 5 drives the T-shaped spring seats 9 to move backward, so that the helical teeth of the movable rack 4 and the fixed rack 11 shear each other, and the movable rack 4 and the fixed rack 11 shear destructively. In this way, second-stage energy absorption is realized through the energy absorption mechanisms to absorb part of the energy generated during the collision. Meanwhile, the movable cross beam 5 drives the movable longitudinal beams 7 backward, the pins 17 fixing the movable longitudinal beams 7 are cut, and the movable cross beam 5 move backward and the movable longitudinal beams 7 push the piston ejector rods 6b to move backward, thereby realizing third-stage energy absorption to absorb part of the energy generated during the collision, so as to effectively reduce collision energy transferred to the car body and driving cab.

What is claimed is:

1. An active extension car front bumper, comprising a fixed and left-right symmetrical U-shaped fixed frame disposed right behind the bumper, wherein a U-shaped opening of the U-shaped fixed frame faces a direction opposite to the bumper, and the U-shaped fixed frame includes a cross beam on a front side and one left longitudinal beam and one right longitudinal beam, three fixed sleeves distributed respectively on the left, in the middle, and on the right are rigidly connected to a rear side wall of the cross beam of the U-shaped fixed frame, an impact rod is fitted with clearance in the middle of an interior of each fixed sleeve, a front end of each impact rod passes through the cross beam of the U-shaped fixed frame and then is fixedly connected to the bumper, and a rear end of each impact rod extends out of the fixed sleeve and then is fixedly connected to a movable cross beam that is arranged horizontally left and right; the left longitudinal beam and the right longitudinal beam of the U-shaped fixed frame are each provided with a movable longitudinal beam that is capable of moving forwardly and backwardly, a left end and a right end of the movable cross beam respectively extend into the corresponding left longitudinal beam and the corresponding right longitudinal beam of the U-shaped fixed frame and are fixedly connected to front ends of the corresponding movable longitudinal beams, and a rear end of each movable longitudinal beam is fixedly connected to a hydraulic mechanism; an energy absorption mechanism is provided between every two adjacent fixed sleeves, each energy absorption mechanism comprises a fixed rack that is horizontal in forward and backward directions, a front end of the fixed rack is rigidly connected to the cross beam of the U-shaped fixed frame, a left side wall and a right side wall of the fixed rack are both provided with helical teeth and the helical teeth are inclined forwardly, two movable racks are respectively distributed on a left side and a right side of the fixed rack, and helical teeth of the two movable racks are inclined backwardly and engaged with the helical teeth of the fixed rack; a left side and a right side of the fixed rack are each further provided with a T-shaped spring seat, a rear end of the T-shaped spring seat is rigidly connected to the movable cross beam, and a return spring that is arranged horizontally left and right is connected between the T-shaped spring seat and the movable rack on a same side; each impact rod has a stepped rod shape comprising a front segment and a rear segment, wherein a diameter of the front segment is larger than a diameter of the rear segment, a high-strength spring is disposed inside each fixed sleeve, and the high-strength spring is fitted with clearance on the rear segment of the impact rod; a positioning mechanism capable of locking the movable longitudinal beam is connected to each longitudinal beam of the U-shaped fixed frame, the hydraulic mechanisms simultaneously drive the movable longitudinal beams and the movable cross beam to push out forwardly, the movable cross beam pushes the T-shaped spring seats and the impact rods forwardly, and the bumper extends forwardly.

2. The active extension car front bumper according to claim 1, wherein each positioning mechanism comprises a pin bushing, a pin spring and a pin, the pin bushing is fixedly connected to an inner side wall of the corresponding longitudinal beam of the U-shaped fixed frame, the pin spring and the pin arranged horizontally left and right are provided inside the pin bushing, an inner end of the pin spring is rigidly connected to the pin bushing, and an outer end of the pin spring is rigidly connected to an inner end of the pin, and an outer end of the pin is capable of extending into the corresponding longitudinal beam and locking the corresponding movable longitudinal beam.

3. The active extension car front bumper according to claim 1, wherein the U-shaped fixed frame is arranged symmetrically left and right, and central axes of the U-shaped fixed frame, the bumper, and the fixed sleeve in the middle are colinear.

4. The active extension car front bumper according to claim 1, wherein a guide rail arranged in the forward and backward directions is disposed inside each longitudinal beam of the U-shaped fixed frame, each movable longitudinal beam is provided with pulleys, and the pulleys match the guide rail on the corresponding longitudinal beam of the U-shaped fixed frame.

5. The active extension car front bumper according to claim 1, wherein the T-shaped spring seat is provided with a guide rail, a front end surface of the movable cross beam is provided with an identical guide rail, and a front end surface and a rear end surface of the movable rack are both provided with recesses matching the guide rails.

6. The active extension car front bumper according to claim 1, wherein each hydraulic mechanism comprises a hydraulic cylinder and a piston ejector rod, a cylinder body of the hydraulic cylinder is fixedly connected to a rear end of the corresponding longitudinal beam of the U-shaped fixed frame, and the piston ejector rod extends forwardly from the hydraulic cylinder into the corresponding longitudinal beam of the U-shaped fixed frame and is fixedly connected to a rear end of the corresponding movable longitudinal beam.

* * * * *